Oct. 27, 1936.  L. DUFOUR  2,058,964
AGRICULTURAL TRACTOR
Filed Jan. 6, 1936   8 Sheets-Sheet 1
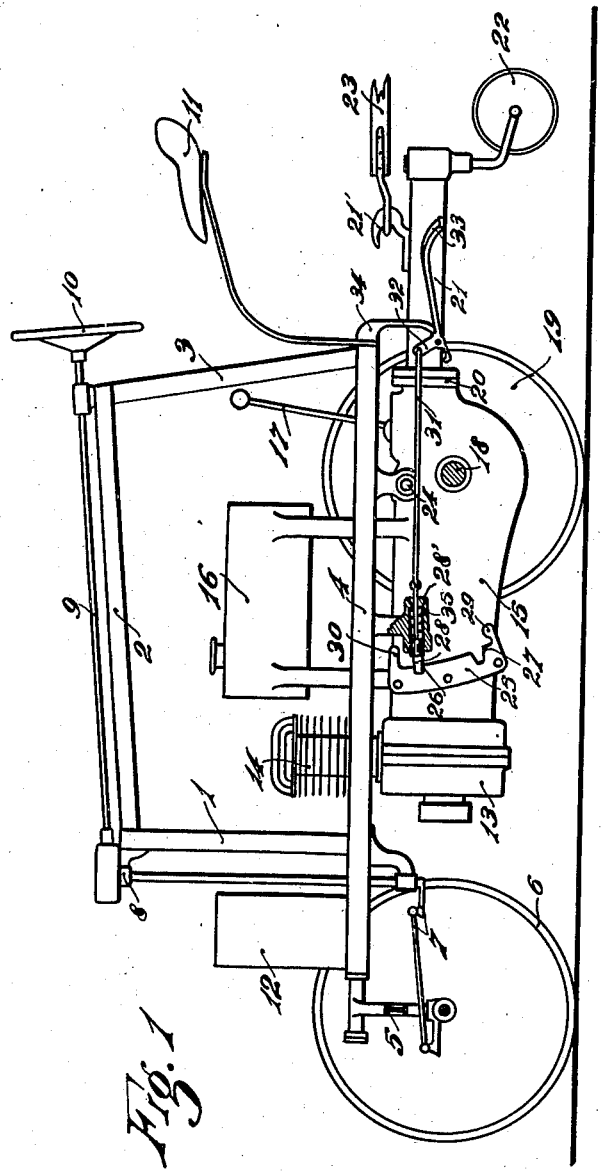
L. Dufour
INVENTOR
By Glascock Downing & Seebold
Attys.

Oct. 27, 1936.  L. DUFOUR  2,058,964
AGRICULTURAL TRACTOR
Filed Jan. 6, 1936    8 Sheets-Sheet 2
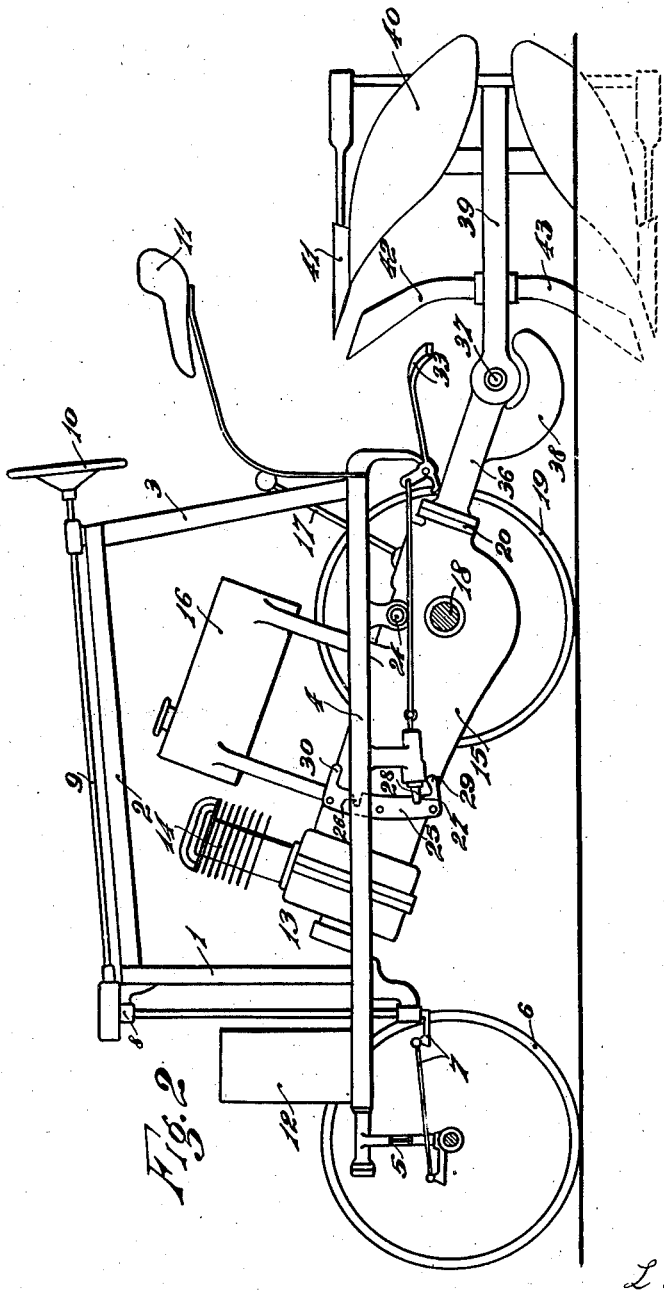

Oct. 27, 1936.  L. DUFOUR  2,058,964
AGRICULTURAL TRACTOR
Filed Jan. 6, 1936  8 Sheets-Sheet 3
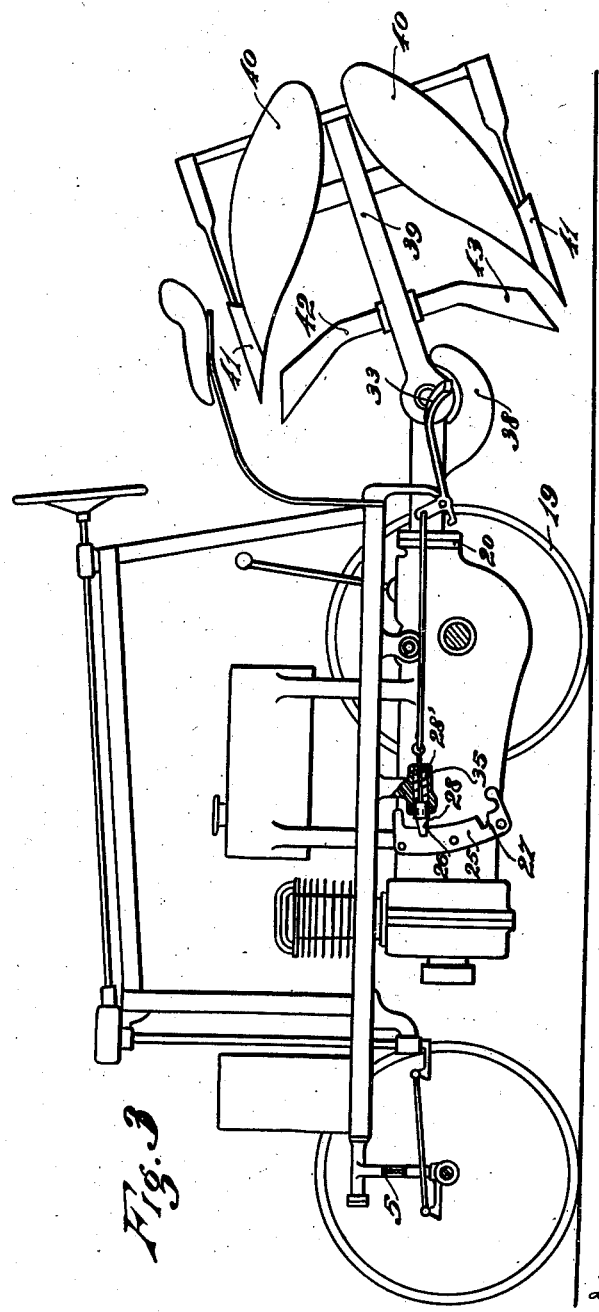

Oct. 27, 1936.                L. DUFOUR                    2,058,964
                          AGRICULTURAL TRACTOR
                          Filed Jan. 6, 1936              8 Sheets-Sheet 4
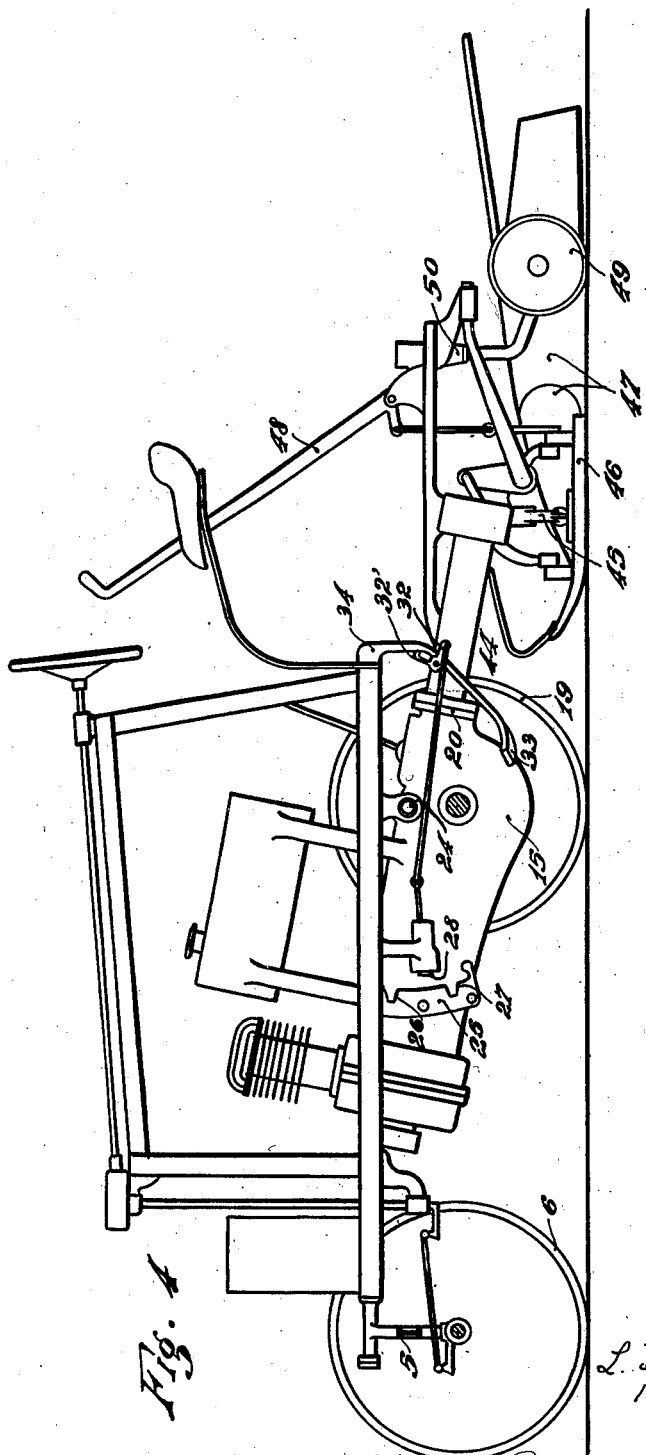

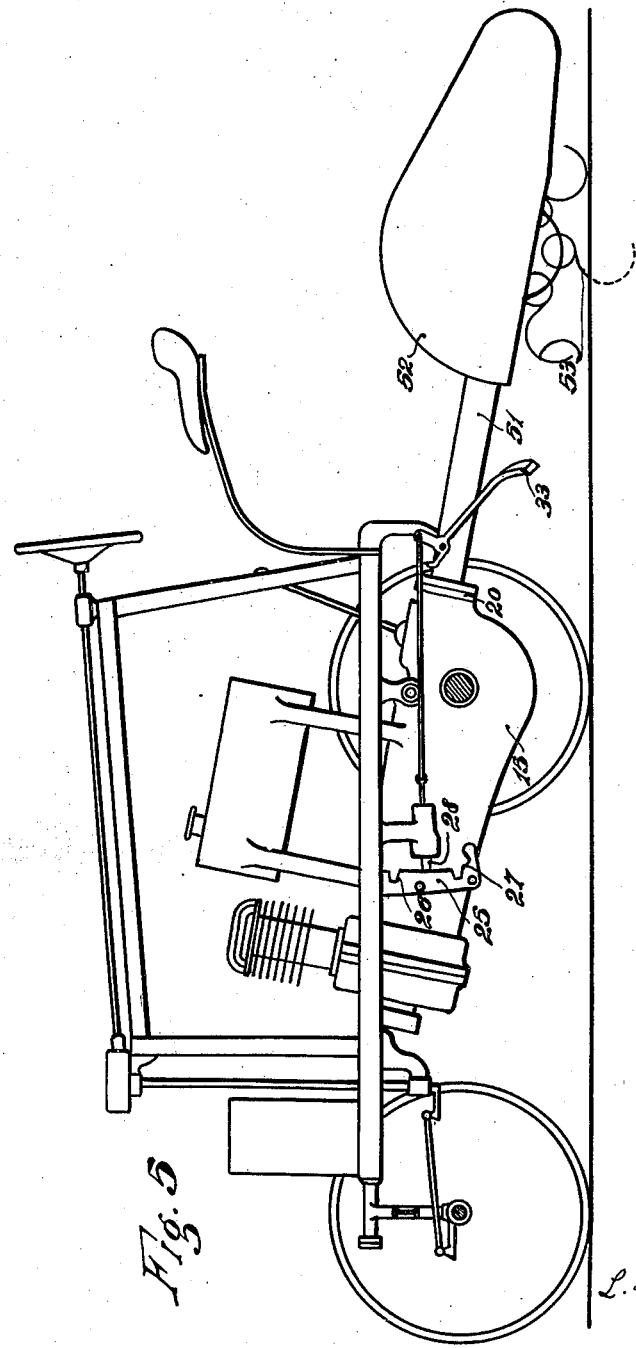

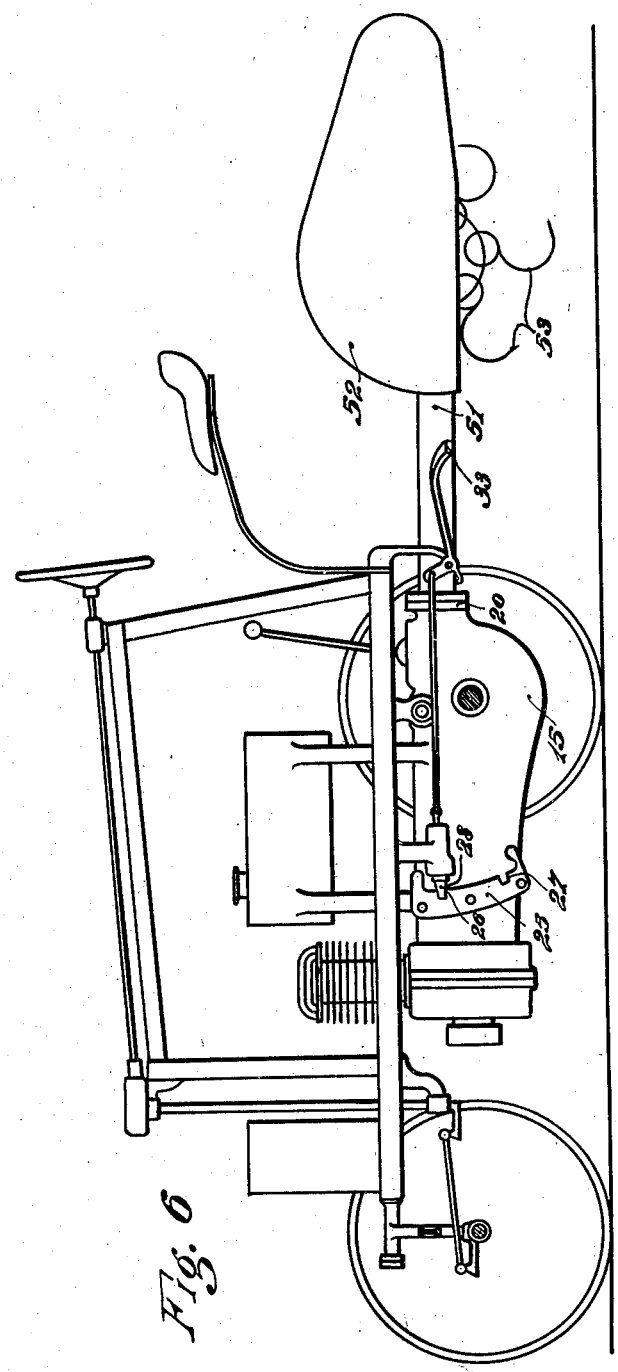

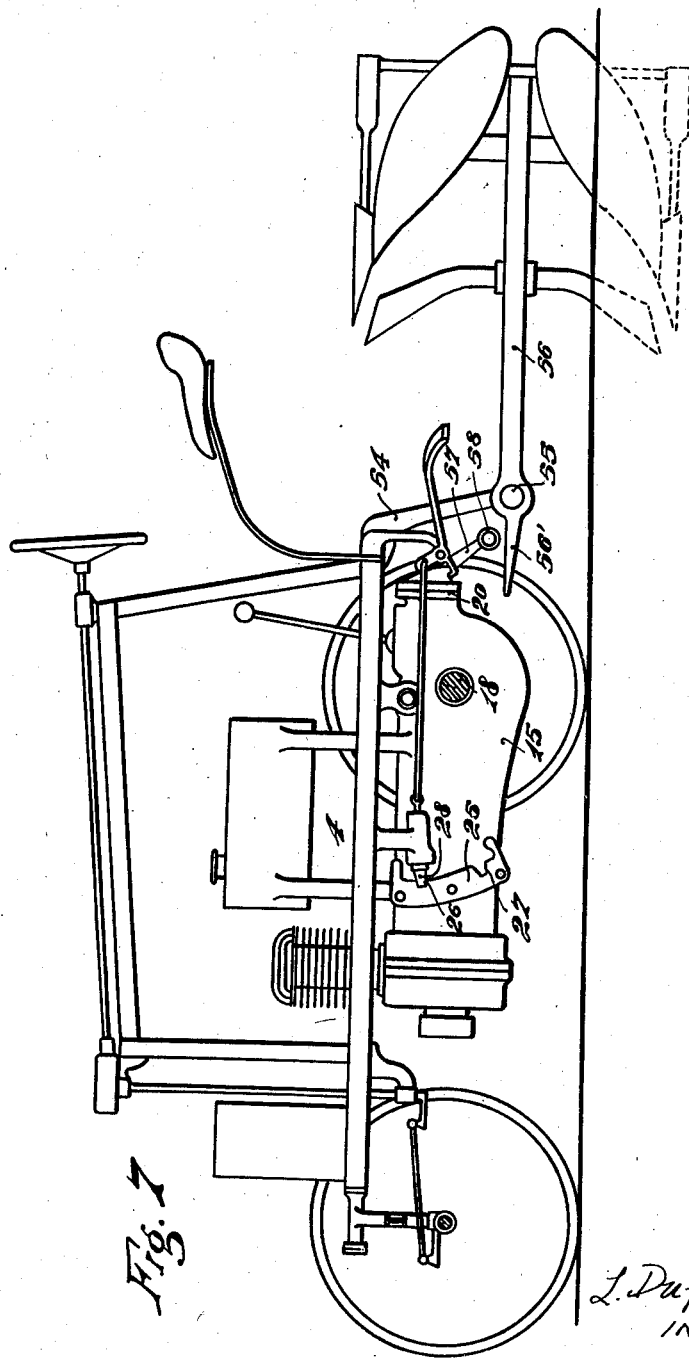

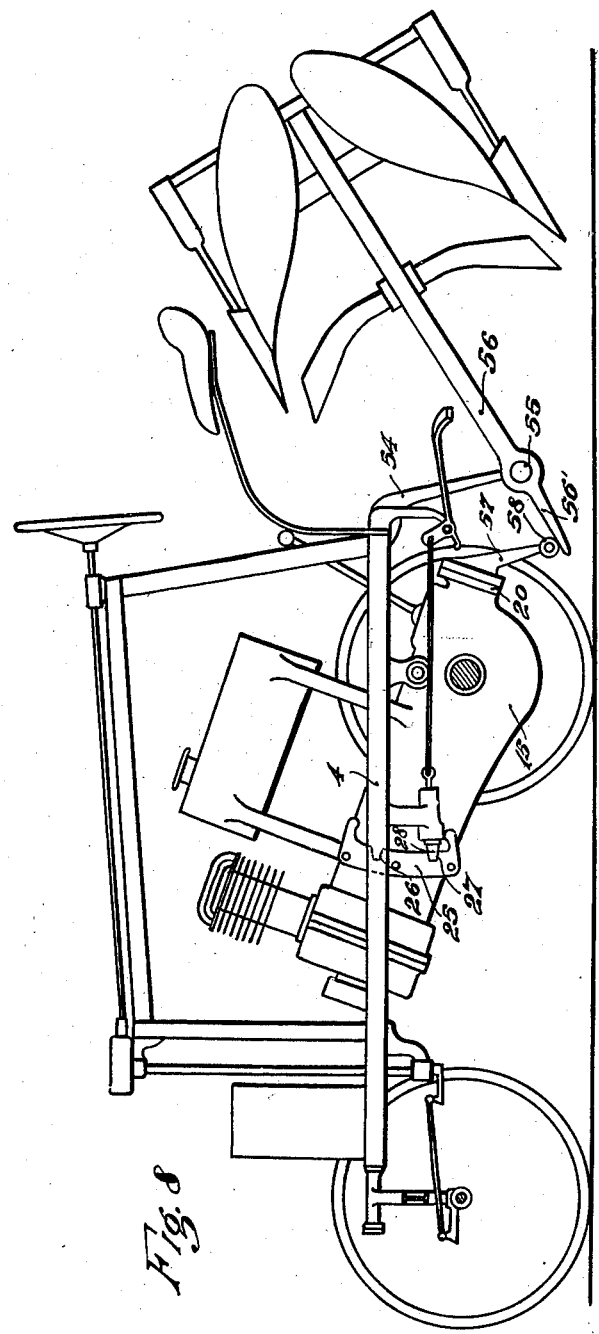

Patented Oct. 27, 1936

2,058,964

UNITED STATES PATENT OFFICE 2,058,964

AGRICULTURAL TRACTOR

Léon Dufour, Versoix, Switzerland

Application January 6, 1936, Serial No. 57,830
In Switzerland October 10, 1935

8 Claims. (Cl. 97—232)

This invention relates to agricultural tractors of the type comprising a relatively stationary part including the frame of the tractor, the front wheels and the seat of the driver, and an oscillatory tractor part including the motor with its accessories and the entire change speed and transmission gear for transmitting the power of the motor to the driving axle, the oscillatory tractor part being connected to the relatively stationary part for effecting a limited oscillatory movement about a transverse axis which may be the driving axle itself or about a supplemental axis extending parallel to and in close proximity of the driving axle.
Heretofore most or even all tractors have been designed to simply replace the draught animals. The object of the present invention is the provision of an agricultural tractor capable of adapting itself to and combining organically with the principal agricultural implements destined to be pulled or operated by the tractor on the fields.

This object is realized by the provision of a device operable to engage with the oscillatory tractor part and to temporarily lock this part to the relatively stationary tractor part, at least at both limits of the course of oscillatory movement of the oscillatory tractor part.

Another object is the provision of means capable of automatically producing the above mentioned locking of the oscillatory tractor part, while an operating member placed under the control of the driver of the tractor is used to release the oscillatory tractor part.

A still further object of the invention is the provision of a transversely extending trunnion carried by the tractor for pivotal connection of an agricultural implement such as a plow, a cultivator, an extirpator and like tools requiring a powerful traction and which must be raised at the end of the field when turning the tractor, and of a member carried by the oscillatory tractor part and coacting with the implement for raising and lowering the implement only by throwing the tractor into forward or reverse speed and applying, if necessary, the brakes to the driving wheels, without requiring any supplementary raising and lowering mechanism actuated by hand or by the motor.

In the case of agricultural implements not requiring a considerable tractive effort but utilizing a part of the motor power for being actuated, such as mowing machines, rotatable cutters, potato-diggers, and like machines, these can be directly and rigidly attached to the rear of the oscillatory tractor part and can thus be operated by being directly coupled to the motor shaft without requiring a Cardan joint.

With these and other objects in view, the present invention provides a tractor which, as will appear from the following description, is organically combined with the agricultural implements which it is destined to pull and permits the use of these implements under much more favorable conditions than it would be possible with ordinary tractors or traction animals.

In the accompanying drawings showing various embodiments of the invention,

Figure 1 is a side elevation of an agricultural tractor according to the invention and used to pull any cart or wagon.

Figure 2 shows a tractor coupled with a plow in working position.

Figure 3 represents the same tractor with the plow in raised position, for turning at the end of a field or for driving the tractor on the road from the farm house to the field.

Figure 4 shows a tractor combined with a mowing machine.

Figure 5 represents a tractor coupled with a rotary tilling tool in working position.

Figure 6 represents the same tractor with the rotary tilling tool in raised position.

Figures 7 and 8 show a tractor pulling a plow in working position and in raised position, respectively, and provided with modified means for raising and lowering the plow.

In all the figures the tractor is represented with the left hand front and rear wheels supposedly removed, for the sake of clearness of the drawings. Similar reference numerals refer to similar parts throughout the several figures.

The tractor shown in Figure 1 comprises a relatively stationary part including a frame work composed of frame members 1, 2, 3 and 4. This frame work carries the front axle 5 with the two front guiding wheels 6, the steering gear members 7, 8 and 9, the steering wheel 10, and the seat 11 for the driver. A counterweight 12 is provided for increasing the weight of the front part of the tractor in order to prevent the tractor from turning over due to the rearing reaction which becomes effective as soon as the oscillatory tractor part is locked to the relatively stationary part.

The oscillatory tractor part is composed of the motor 13 having a cylinder 14 provided with cooling ribs, and of the change speed box 15 supporting the fuel reservoir 16 and the speed control lever 17. The driving axle 18 is supported by the box 15 and carries two driving wheels 19.

At the rear end the speed box 15 is provided with a flange 20. A draught beam 21 is detachably secured to the flange 20 and carries a safety roller 22 destined to prevent the tractor in any case from tilting backwards. The draught beam 21 carries a hook 21' to which is attached the pole 23 of the pulled car. The relatively stationary tractor part and the oscillatory tractor part are connected to each other by a shaft 24 extending parallel to the axle 18 and situated in proximity of this axle.

To the front portion of the change speed box 5 is secured a segment 25 provided with two notches 26 and 27 into one or the other of which can penetrate a selflocking bolt 28 urged against the segment by a spring 28'. The bolt 28 slides in a guiding bracket 35 supported by the frame member 4. The segment 25 comprises also two extensions 29 and 30 forming abutments to limit the course of oscillatory movement of the oscillatory tractor part.

The bolt 28 can be withdrawn from engagement with one of the notches 26 or 27 by means of a rod 31 connected to a lever 32 which is operated by a pedal 33 and rotatably mounted on a bracket 34 carried by the frame of the tractor. In Fig. 1 the bolt 28 is shown engaged in the upper notch 26 of the segment 25. The pivoting part of the tractor has its front portion in the lowest position and extends in approximately horizontal direction. By the intermediary of the segment and the bolt the oscillatory part has become rigidly secured to the relatively stationary part of the tractor. This latter then acts exactly as an ordinary tractor since the oscillatory part cannot move any more relative to the stationary part. An important fraction of the weight of the front part of the tractor (guiding wheels 6, counterweight 12, motor 13, etc.) is bearing on the driving wheels 19 and thus contributes to increase the adherence of these wheels to the ground, and consequently the tractive power developed at the coupling hook 21' of the tractor.

Figure 2 represents the tractor coupled with a plow in working position. The oscillatory tractor part is here maintained with its front portion in the highest position of oscillatory movement. The bolt 28 is engaged in the lower notch 27 of the segment 25. The extension 29 prevents the oscillatory tractor part from tilting further, even when the bolt 28 is disengaged by operating the pedal 33 with the foot. A supporting arm 36 is secured to the flange 20 of the gear box 15 and carries a trunnion 37 extending parallel to the axle 18 and connecting the plow beam 39 to the arm 36. The beam 39 carries the mold boards 40, the shares 41 and the colters 42 and 43. A heavy bracket 38, forming a rearwardly directed extension of the arm 36 and ending in the rear of the trunnion 37, prevents the plow from pivoting substantially further downwards than shown in Fig. 2. The plow can however at all times freely turn upwardly about the trunnion 37 when the colter or the share runs against an obstacle, such as a big stone, for instance. This possible tilting movement of the plow also prevents the plow from transforming the rearing reaction, produced when the tractor advances, into a pressure against the ground. This reaction can only charge the driving wheels of a part of the weight of the front wheels 6, of the counter-weight 12, of the weight of the motor, etc., so that the driving wheels thus weighted will obtain the maximum of adherence for pulling the plow. The same conditions would be obtained if, instead of a plow, a cultivator, an extirpator, a harrow or like implement would be connected to the trunnion 37, but care must be taken that these tools have only a slight play in the direction towards the ground relative to the abutment 38.

When the tractor arrives at the end of a furrow, the plow, or cultivator, extirpator and the like, must be raised in order to be able to turn the tractor. For doing this, it suffices to stop the tractor, to push with the foot on the pedal 33 in order to retract the bolt 28 from the notch 27 of the segment 25, and to throw the tractor in reverse speed. The rearing reaction then acts on the oscillatory part of the tractor which has been released, but in a direction opposed to the usual one when the tractor advances. The front portion of the oscillatory tractor part tilts downwardly owing to this reaction and the tail end is raised. The bracket 38 raises the beam 39 of the plow (or of the body of the cultivator, extirpator, or the like), until the bolt 28 penetrates into the notch 26 of the segment 25. Naturally, the foot of the driver must release the pedal 33 before the bolt can engage the notch, so that the bolt becomes self-locking owing to the action of the spring 28'. The tractor and plow are then in the position represented in Fig. 3. Also in this position the tractor can pull the plow on the road from the farm house to the field to be plowed. When the rearing reaction is not sufficient to raise the plow, in case, for instance, this latter is heavy owing to soil sticking on the plow share, the brakes of the driving wheels, not represented in the drawings, with which all tractors are provided, will be tightened. The driving wheels can then not turn backwards and the entire power of the motor is made use of to tilt the oscillatory tractor part, and this power will in any case be sufficient to raise even the heaviest plows, cultivators or extirpators.

In order to pass from the position shown in Fig. 3 to that shown in Fig. 2, it suffices to retract the bolt 28 by means of the pedal 33, and then to throw the tractor in forward speed while releasing the pedal and tightening eventually the brakes of the driving wheels. The rearing reaction then raises the front portion of the tractor part until the bolt 28 engages with the notch 27, and the plow will work itself into the soil to take again the position shown in Fig. 2. It will be apparent that the foot pedal 33 could be replaced by a hand lever, but the pedal is more practical in use. These operations at the end of a plowed furrow for raising the plow to the position of driving on a road and to lower it again into working position are simple and rapidly performed and impart to the described tractor a considerable advantage over the ordinary tractors and even over draught animals. The throwing of the tractor into forward or reverse speed, eventually assisted by applying the brakes, is largely sufficient for raising and lowering the plow, and no supplementary lifting mechanism operated by hand or by motor is needed for moving the plow from one of its positions to the other one.

Fig. 4 represents the tractor coupled with a mowing machine. A hollow connecting arm 44 is secured to the flange 20 of the gear box 15 and encloses a shaft which is connected to the power take off in the gear box and therefore actuated by the motor. This shaft actuates the connecting rod 45 of the mowing machine of which the shoe 46 of the cutter bar, the swath board 47 and the raising lever 48 for the cutter bar are visible in the drawings. The weight of the mowing machine and the reaction of the oscillatory tractor part are supported at the rear by a roller 49 turning loosely in a bearing 50. For mowing it is evidently not necessary that the driving wheels of the tractor exert a powerful traction, and it is therefore possible to have the oscillatory tractor part freely oscillate about the trunnion 24. The bolt 28 is completely retracted by pushing the pedal 33 far enough in order that the lever 32 passes beyond its dead point position. An extension 32' on the lever 32 abutting against the bracket 34, maintains the pedal in this position. From now on the oscillatory tractor part can freely oscillate within the limits permitted by the roller 49 which exactly follows the unevenness of the ground, so that the connecting rod 45 always maintains the same degree of obliquity and accordingly provides a better mowing performance. Also since the entire rearing reaction of the tractor is supported by the roller 49 and not by the weight of the front portion of the tractor, this latter will not have any tendency to turn over, even if mounting a steep slope, so that the described tractor can be used for working on pieces of ground which heretofore were inaccessible even to horses. As the bolt 28 stays permanently retracted, it cannot catch into the notches 26 or 27 even in case of a great up-and-down swinging movement of the oscillatory tractor part, which could happen when the roller 49 passes into a ditch or over a marked bump on the ground. In order to drive on a road between the farm house and the field, the cutter bar 46 will be raised as usual by the lever 48 and the roller 49 will continue to roll on the road without any inconvenience.

Figures 5 and 6 represent the tractor coupled with a rotatable cutter, Fig. 5 shows the cutter in working position and Fig. 6 in raised position for driving on a road. A hollow supporting member 51 is secured to the flange 20 of the gear box 15 and contains a driving shaft for the cutter tool coupled to the motor shaft. The cutter comprises a hood 52 and rotatable cutter tools 53. As shown in Fig. 5, the cutter works in the soil and can adjust the working depth itself by means of a not represented depth shoe. The bolt 28 is applied by its spring against the segment 25 at a point intermediate the notches 26 and 27. The pedal 23 has not been pushed so far as to render the bolt inoperative, as shown in Fig. 4, because it is necessary to raise the cutter at the end of the field for turning the tractor. In order to raise the cutter the tractor is stopped and then the tractor thrown in reverse speed, if necessary by applying the brakes to the driving wheels; the oscillatory tractor part will then swing downwardly with its front portion until the bolt 28 engages with the notch 26. The cutter is then raised into the position for driving on the road, as represented in Fig. 6. After having turned the tractor the cutter is lowered into working position by pushing the pedal 33, so that the cutter can fall down into working position.

Figures 7 and 8 show a modified device for connecting the plow to the tractor. A bracket 54 is secured to the frame member 4 and carries a trunnion 55 having its axis extending parallel to the driving axle 18. The plow beam 56 is rotatably connected to this trunnion and comprises an extension 56' reaching forwardly beyond the trunnion 55. The flange 20 of the gear box 15 carries an arm 57 supporting a roller 58 which, in normal working position of the plow, almost makes contact with the extension 56'. Fig. 7 shows the plow engaged in the ground; the bolt 28 is engaged in the upper notch 26 of the segment 25. At the end of the field the bolt 28 is withdrawn from the notch, while the tractor remains in forward speed and continues to advance; the rearing reaction, assisted if necessary by tightening the brakes of the driving wheels, makes the front portion of the oscillatory tractor part swing upwardly until the bolt engages into the notch 27. The arm 57 swings downwardly and by the intermediary of the roller 58 acting on the extension 56' of the plow beam, raises the plow into the position shown in Fig. 8. In order to lower the plow into the ground, the bolt 28 only must be retracted from the notch 27 and then, without even throwing the tractor in reverse speed, the motor and the gear box 15 will swing back to their horizontal position owing to their weight and the bolt 28 reengages with the notch 26, while the roller 58, swinging upwardly with the tail end of the gear box, permits the plow to fall down on the ground. As will be apparent, the operations necessary for raising and lowering the plow according to this modification are just the reverse of those required in the example according to Figs. 2 and 3. Still other modifications could be used for connecting a plow to the tractor without departing from the spirit of the invention.

The described examples show the variety of applications which a tractor according to the invention can receive and the many advantages which are derived from the fact that the tractor is organically combined with the agricultural implements destined to be pulled or operated by the tractor.

I claim:—

1. An agricultural tractor comprising a relatively stationary tractor part, an oscillatory tractor part connected to the relatively stationary tractor part for limited oscillatory movement about a transverse axis, means for locking the oscillatory tractor part to the relatively stationary tractor part at the two limits of oscillatory movement of the oscillatory part, means for releasing the oscillatory tractor part from locking engagement with the relatively stationary part, a transversely extending trunnion for pivotably connecting an agricultural implement to the tractor, a bracket carried by the rear end of the oscillatory tractor part and coacting with said implement for tilting the implement about said trunnion upon a movement of oscillation of said oscillatory tractor part.

2. An agricultural tractor comprising a relatively stationary tractor part, an oscillatory tractor part connected to the relatively stationary part for effecting a limited oscillatory movement about a transverse axis, means for automatically locking the oscillatory tractor part to the relatively stationary tractor part at the two limits of oscillatory movement for preventing oscillatory movement of the oscillatory tractor part, means operable by the driver of the tractor for effecting release of the oscillatory tractor part, a transversely extending trunnion carried by the rear end of the oscillatory tractor part for pivotally connecting an agricultural implement to the tractor, a bracket carried by the rear end of the oscillatory tractor part and extending rearwardly beyond said trunnion, said bracket coacting with the agricultural implement for tilting the implement about said trunnion upon a movement of oscillation of said oscillatory tractor part.

3. An agricultural tractor comprising a relatively stationary tractor part, an oscillatory tractor part connected to the stationary part for limited oscillatory movement about a transverse axis, means for automatically locking the oscillatory tractor part to the relatively stationary tractor part at the two limits of oscillatory movement, means operable by the driver for effecting release of the oscillatory tractor part, a transversely extending trunnion carried by the relatively stationary tractor part for pivotably connecting an agricultural implement to the tractor, and a bracket carried by the rear end of the oscillatory tractor part and coacting with a part of the agricultural implement extending forwardly beyond said trunnion for tilting the implement about the trunnion upon a movement of oscillation of the oscillatory tractor part.

4. An agricultural tractor comprising a relatively stationary tractor part including the main frame work, an oscillatory tractor part pivotally mounted on a transverse axis and carrying the motor of the tractor in front of said transverse axis, a self-acting locking device for locking the oscillatory tractor part to the relatively stationary tractor part, said locking device including a notched segment secured to one of said two tractor parts, a self-locking bolt slidably carried by the other of said parts, said segment being provided with two vertically spaced notches for engaging said bolt in either one of two positions of oscillatory movement of said oscillatory tractor part, and coacting means on the two tractor parts for limiting the movement of the oscillatory tractor part to an angle comprised between said two positions of oscillatory movement determined by the engagement of the self-locking bolt in one or the other of said two notches.

5. An agricultural tractor comprising a relatively stationary tractor part including the main frame work, an oscillatory tractor part pivotally mounted for limited oscillatory movement about a transverse axis, said oscillatory tractor part carrying the motor in front of said transverse axis, a self-acting locking device for locking the oscillatory tractor part to the relatively stationary tractor part, said locking device including a notched segment secured to one of said tractor parts, a self-locking bolt slidably carried by the other of said tractor parts, said segment being provided with two vertically spaced notches for engaging said bolt in either one of the two extreme positions of oscillatory movement of the oscillatory tractor part, means operated by the driver for retracting said bolt to effect release of the oscillatory tractor part, and means for locking the bolt in retracted inoperative position.

6. An agricultural tractor comprising a relatively stationary tractor part including the main frame work, an oscillatory tractor part pivotally mounted on a transverse axis and carrying the motor of the tractor in front of said transverse axis, means on the rear end of the oscillatory tractor part for connecting an agricultural implement thereto, a self-acting locking device for locking the oscillatory tractor part to the relatively stationary tractor part, said locking device including a notched segment secured to one of said two tractor parts, a self locking bolt slidably carried by the other of said tractor parts, said segment being provided with two vertically spaced notches for engaging said bolt in either one of two different positions of oscillatory movement of said oscillatory tractor part, means on said segment for limiting the movement of the oscillatory tractor part to an angle comprised between said two different positions of oscillatory movement determined by the engagement of the self-locking bolt in one or the other of said two notches, means operated by the driver for retracting said bolt to effect release of the oscillatory tractor part, and means for locking the bolt in retracted, inoperative position.

7. An agricultural tractor comprising a relatively stationary tractor part including the main frame work, an oscillatory tractor part connected to the relatively stationary part for limited oscillatory movement about a transverse axis and carrying the motor of the tractor—a self-acting locking device for locking the oscillatory tractor part to the stationary part at the two limits of oscillatory movement of the oscillatory tractor part, a transversely extending trunnion for pivotally connecting an agricultural implement to the tractor, and a bracket carried by the rear end of the oscillatory tractor part and coacting with said implement for limiting the downward oscillation of the implement about said trunnion and for raising the implement above the ground upon a movement of oscillation of said oscillatory tractor part.

8. An agricultural tractor comprising a relatively stationary tractor part including the main frame work, an oscillatory tractor part connected to the relatively stationary part for limited oscillatory movement about a transverse axis and carrying the motor of the tractor, a self-acting locking device for locking the oscillatory tractor part to the stationary part at the two limits of oscillatory movement of the oscillatory tractor part, a transversely extending trunnion carried by the rear end of the oscillatory tractor part for pivotally connecting an agricultural implement to said tractor part, and a bracket carried by the rear end of the oscillatory tractor part and coacting with said implement for limiting the downward oscillation of said implement about said trunnion and for raising the implement above the ground upon a movement of oscillation of said oscillatory tractor part.

LÉON DUFOUR.